United States Patent [19]

Zenda

[11] Patent Number: 4,980,678
[45] Date of Patent: Dec. 25, 1990

[54] DISPLAY CONTROLLER FOR CRT/FLAT PANEL DISPLAY APPARATUS

[75] Inventor: Hiroki Zenda, Tokyo, Japan

[73] Assignee: Kabushiki Kaisha Toshiba, Kawasaki, Japan

[21] Appl. No.: 208,044

[22] Filed: Jun. 17, 1988

[30] Foreign Application Priority Data

| Jun. 19, 1987 | [JP] | Japan | 62-152702 |
|---|---|---|---|
| Oct. 31, 1987 | [JP] | Japan | 62-276054 |
| Oct. 31, 1987 | [JP] | Japan | 62-276055 |
| Oct. 31, 1987 | [JP] | Japan | 62-276056 |
| Oct. 31, 1987 | [JP] | Japan | 62-276070 |
| Oct. 31, 1987 | [JP] | Japan | 62-276072 |

[51] Int. Cl.$^5$ .............................................. G09G 3/02
[52] U.S. Cl. ................................. 340/716; 340/781; 340/784; 340/805
[58] Field of Search ............... 340/716, 784, 781, 805, 340/750; 364/900; 350/332, 333; 358/239

[56] References Cited

U.S. PATENT DOCUMENTS

| 3,928,845 | 12/1975 | Clark . | |
| 4,121,283 | 10/1978 | Walker . | |
| 4,399,524 | 8/1983 | Muguruma et al. . | |
| 4,422,163 | 12/1983 | Oldenkamp . | |
| 4,454,593 | 6/1984 | Fleming et al. . | |
| 4,536,856 | 8/1985 | Hiroishi | 364/900 |
| 4,566,005 | 1/1986 | Apperley et al. . | |
| 4,574,279 | 3/1986 | Roberts . | |
| 4,611,203 | 9/1986 | Criscimagna et al. . | |
| 4,628,534 | 12/1986 | Marshall . | |
| 4,730,186 | 3/1988 | Koga et al. | 340/716 |
| 4,751,502 | 6/1988 | Ishii et al. | 340/716 |
| 4,760,387 | 7/1988 | Ishii et al. | 340/716 |
| 4,763,279 | 9/1988 | Kellam et al. . | |
| 4,764,975 | 8/1988 | Inoue et al. . | |
| 4,769,852 | 9/1988 | Hashimoto et al. . | |

OTHER PUBLICATIONS

Operation Manual-Egawonder; ATI Technologies Inc., 1986, pp. 1-37.
Advertisement-Egawonder; PC Magazine; vol. 6, No. 3; Feb./10/89.
IBM Enhanced Graphics Adapter-IBM Enhanced Graphics-(8/2/84); pp. 1-75.

*Primary Examiner*—Alvin E. Oberley
*Assistant Examiner*—M. Fatahiyar
*Attorney, Agent, or Firm*—Finnegan, Henderson, Farabow, Garrett, and Dunner

[57] ABSTRACT

In a system which has a flat panel display as a standard unit, and to which a color display unit can be arbitrarily connected, a CRT palette data buffer and a flat panel display unit palette data buffer are connected to a CPU via a system bus. CRT and PDP default values of palette data set in the buffers are stored in a BIOS.ROM, and are red out therefrom by the CPU and are set in buffers, respectively. When a CRT display unit or a PDP is selected by way of a keyboard operation, the CPU reads out the palette data from the corresponding buffer, and loads it into a palette. A CRT controller then causes the selected display unit to display the palette data set in the palette.

17 Claims, 17 Drawing Sheets

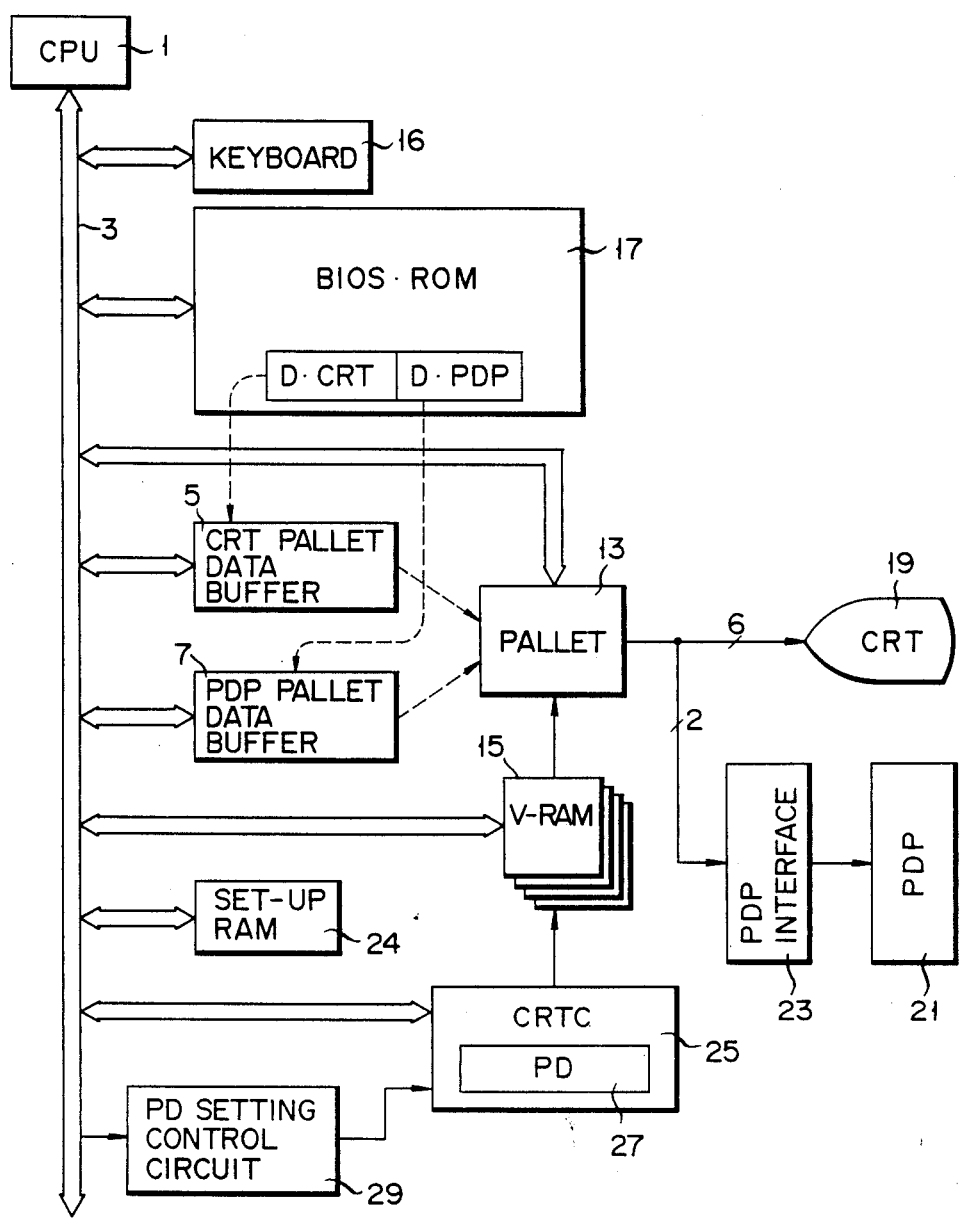
F I G. 1

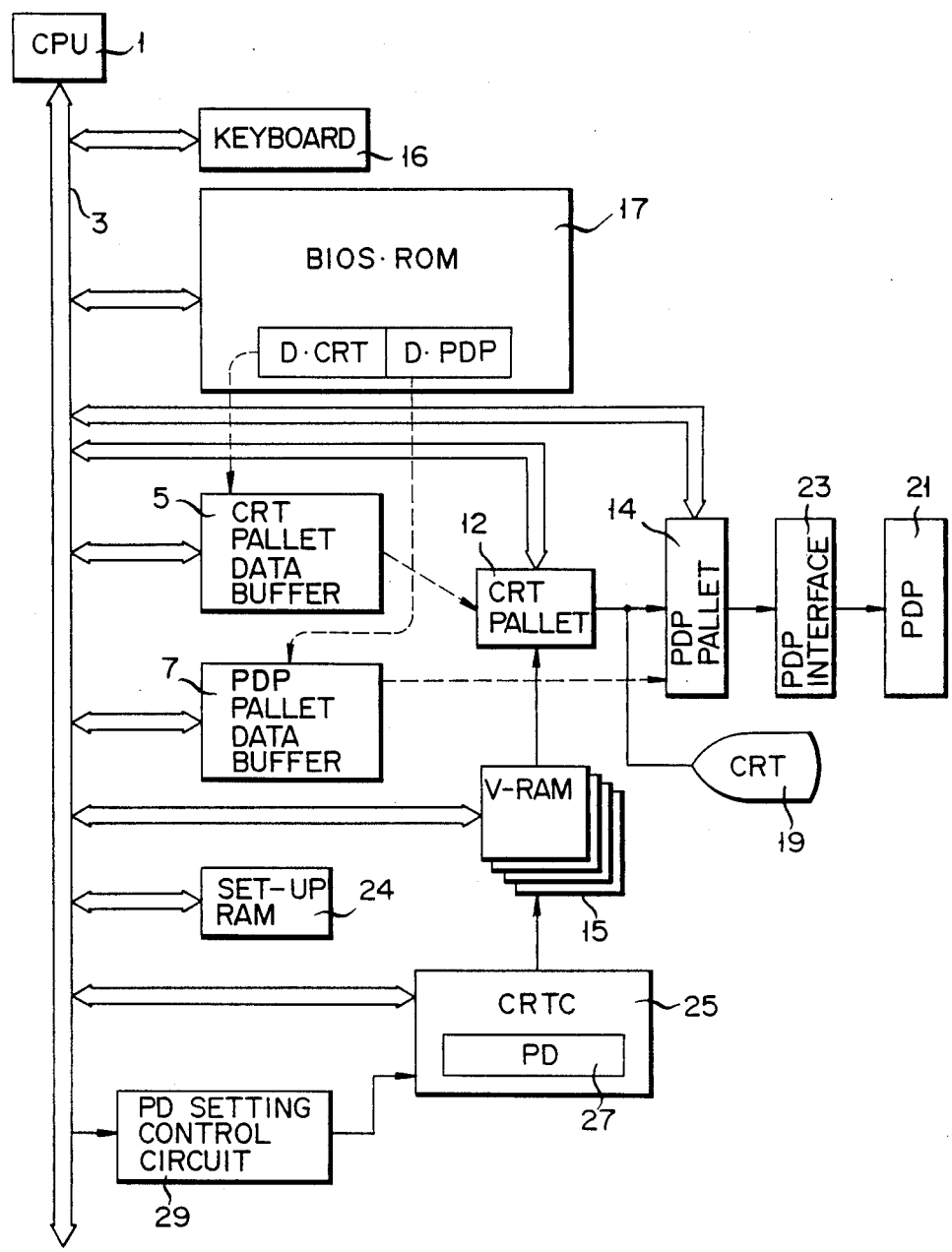
F I G. 9

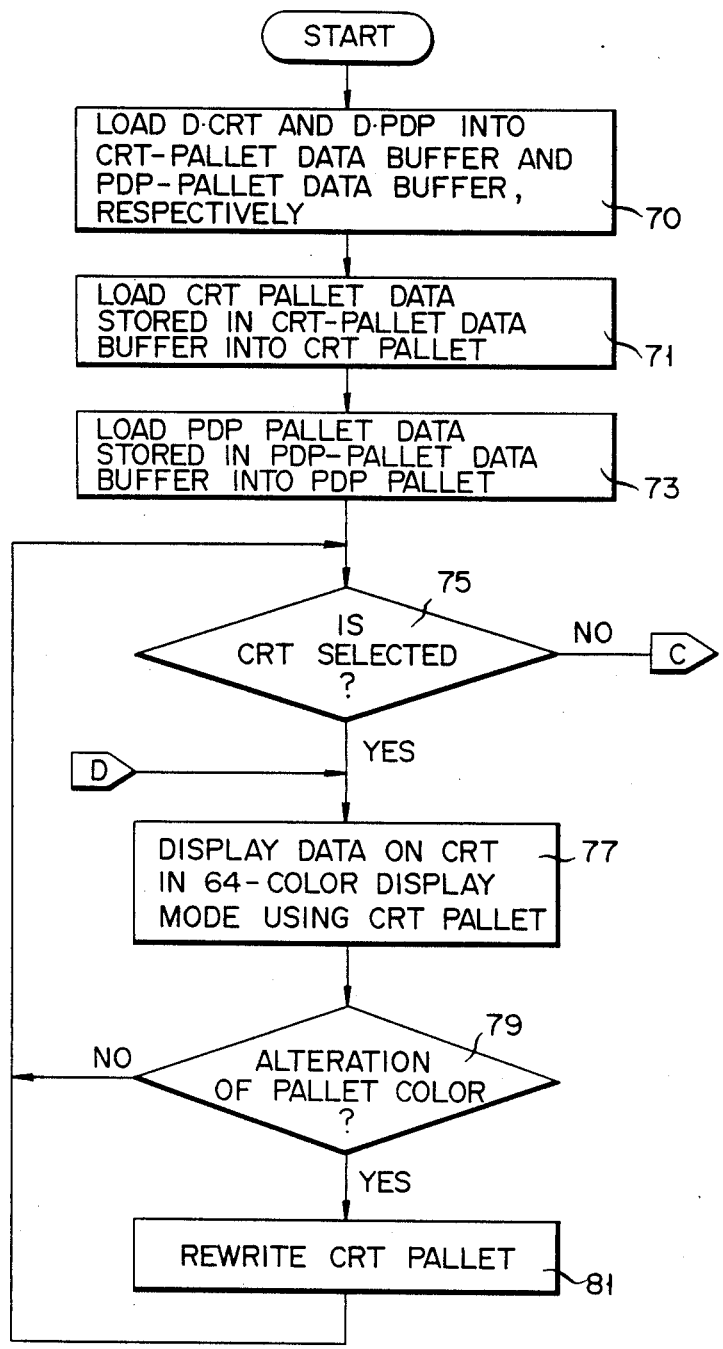
F I G. 11A

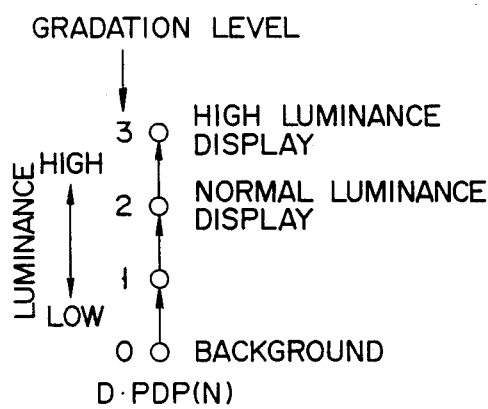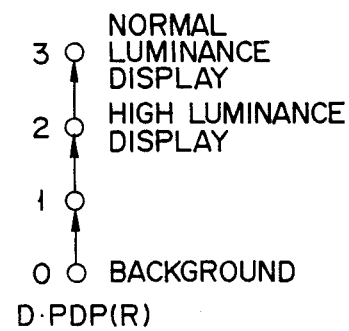
FIG. 16A    FIG. 16B
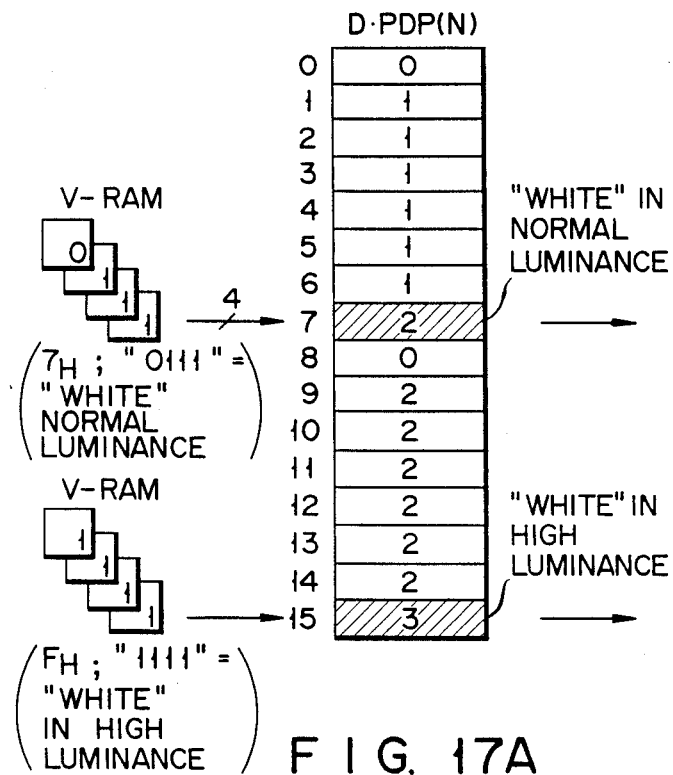
FIG. 17A    FIG. 17B

DISPLAY CONTROLLER FOR CRT/FLAT PANEL DISPLAY APPARATUS

BACKGROUND OF THE INVENTION

1. Field of the Invention

The present invention relates to a display controller for CRT flat panel devices, such as and plasma display apparatuses.

2. Description of the Related Art

Along with the development of microcomputers, a variety of personal computers have been developed. The display apparatuses of such microcomputers may employ flat panel display device such as a plasma display apparatus (PDP). The PDP is controlled by a display controller for a CRT display apparatus (to be referred to as a CRT controller hereinafter).

On the other hand, a cathode ray tube (CRT) display apparatus is widely used as a display apparatus. Therefore, a variety of application programs have been developed in which output data is generated for the CRT display apparatus. A demand has arisen for effective use of such software resources. That is, a PDP is used as a main display apparatus, and a CRT display apparatus is connected as an option, so that the two types of display apparatuses are selectively used in accordance with application programs. In this case, when data from an application program for a CRT display apparatus is to be displayed using a PDP, color display is sometimes disturbed.

In some apparatuses, gradation (that is, variation in gray scale) of a PDP is altered to display color data. However, when gradation display is performed in a conventional PDP, display picture elements, or dots, are thinned or adjacent dots are turned on/off to reduce the gradation level to 1/2, thereby altering the gradation. However, such a pseudo gradation display means cannot alter gradation in correspondence with different color data.

When color data originally generated for display on a color display are displayed on PDP by altering, gradation and when such color data is displayed on CRT under control of a single display controller, if display luminance levels of the CRT are directly used in a PDP without modification, the following problems are posed.

More specifically, the luminance of a PDP is normally lower than that of a CRT. Therefore, if the luminance level of the PDP is set to be higher than a normal value as in the luminance of the CRT, the luminance of normal display is decreased, thus making it difficult to see a display screen.

SUMMARY OF THE INVENTION

It is an object of the prevent invention to provide a display controller for a CRT/flat panel display apparatus which, in a color CRT display apparatus, can provide color display of data generated by an application program created for a CRT display apparatus in correspondence with color data, and in a flat panel display apparatus, can display the data by altering gradation levels of the flat panel device so that the color data can be distinguished from each other.

In order to achieve the above object, a display controller for a CRT/plasma display apparatus of the present invention comprises: single. palette means in which is set display color conversion palette data of the CRT display apparatus or gradation display palette data for the plasma display apparatus; display apparatus selection means for selecting one of the CRT and plasma display apparatuses as a display apparatus; CRT controller means, in which is set a display timing parameter of the display apparatus selected by the display apparatus selection means, for causing the selected display apparatus to display the palette data set in the single palette means at a display timing corresponding to the set display timing parameter; and palette data setting means for setting the display timing parameter corresponding to the display apparatus selected by the display apparatus selection means in the CRT controller means and setting the corresponding palette data in the single palette means.

BRIEF DESCRIPTION OF THE DRAWINGS

Other objects and features of the present invention will be apparent from the following description, taken in connection with the following figures, of which:

FIG. 1 is a block diagram showing an embodiment of a display controller for a CRT/plasma display apparatus according to the present invention;

FIG. 9 is a block diagram showing yet another embodiment of the present invention;

FIGS. 11A and 11B are flow charts showing display processing performed in the embodiment shown in FIG. 9;

FIGS. 16A and 16B are views showing the relationship between gradation and luminance levels in normal display default value D.PDP(N) and high-luminance display level D.PDP(R) in correspondence with CRT display;

FIG. 17A is a view showing a setting order of luminance-gradation levels during gradation display, based on normal display default value D.PDP(N) corresponding to CRT display; and FIG. 17B is a view showing a setting order of luminance-gradation levels during gradation display, based on inverted display default value D.PDP(R) corresponding to CRT display.

DETAILED DESCRIPTION OF THE PREFERRED EMBODIMENTS

Figure 2:
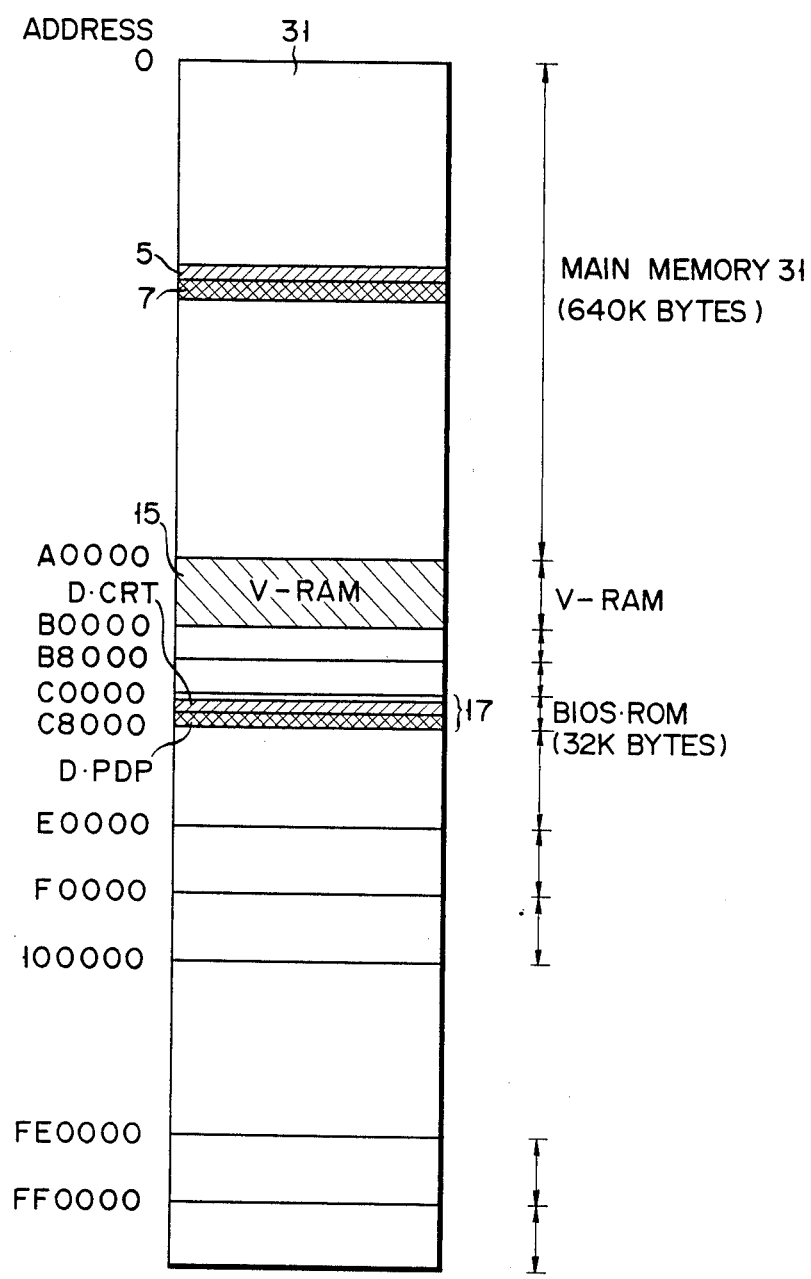
FIG. 2 is a memory map of a main memory used in the embodiment shown in FIG. 1.

FIG. 1 is a block diagram showing an embodiment of the present invention. In FIG. 1, central processing unit (CPU) 1 is connected to system bus 3. CPU 1 can comprise, for example, a 16- or 32-bit one-chip microcomputer. System bus 3 is connected to CRT palette data buffer 5 and PDP palette data buffer 7. Buffer 5 temporarily stores palette data for color CRT display (CRT) 19, and buffer 7 temporarily stores palette data for plasma display (PDP) 21. Palette 13 is connected to CPU 1 through system bus 3, and stores CRT or PDP palette data. More specifically, when the display apparatus in use is CRT 19, CRT palette data is read out from buffer 5 by CPU 1, and is set in palette 13 via system bus 3. Similarly, when PDP 21 is in use, PDP palette data is read out from buffer 7 and set in palette 13, again via system bus 3. Video RAM 15 (to hereinafter be referred to as a V-RAM) is connected to CPU 1, through system bus 3, and is also connected to palette 13. In this embodiment, V-RAM 15 comprises four bit planes. Thus, V-RAM 15 supplies 4 of color data specifying one of 16 colors to palette 13. When the data set in palette 13 is CRT palette data, palette 13 performs color, conversion from 16 colors to 64 colors, based on 4 bits of color data supplied from V-RAM 15. On the other hand, when the data set in palette 13 is PDP palette data, palette 13 performs color-to-gradation conversion from 16 colors to four gradations (i.e. different gray scale values).

BIOS.ROM 17 stores initial values (default values) set in buffers 5 and 7. CRT 19 is connected to palette 13, and performs color display in 64 colors in response to 6-bit display data color-converted by palette 13. PDP 21 receives color-to-gradation converted 2-bit display data from palette 13, via PDP interface 23, and performs gradation display using four gradations. CRT controller (CRTC) 25 selectively display-drives CRT 19 and PDP 21, based on display timing signal generating parameters (PDs) set in display timing register 27. The PDs ar set in register 27 by timing parameter setting control circuit 29, which is connected to CPU 1 through system bus 3.

Keyboard 16 for inputting palette data and various commands, and set-up RAM 24 used for inverted display (to be described later) are connected to CPU 1 through system bus 3.

FIG. 2 is a memory map of a main memory and BIOS.ROM 17. As is shown in FIG. 2, buffers 5 and 7, palette 13, and V-RAM 15 are all located in the main memory. Initial values (D.CRT and D.PDP) set in buffers 5 and 7, respectively, are allocated in BIOS.ROM 17.

Figure 3:
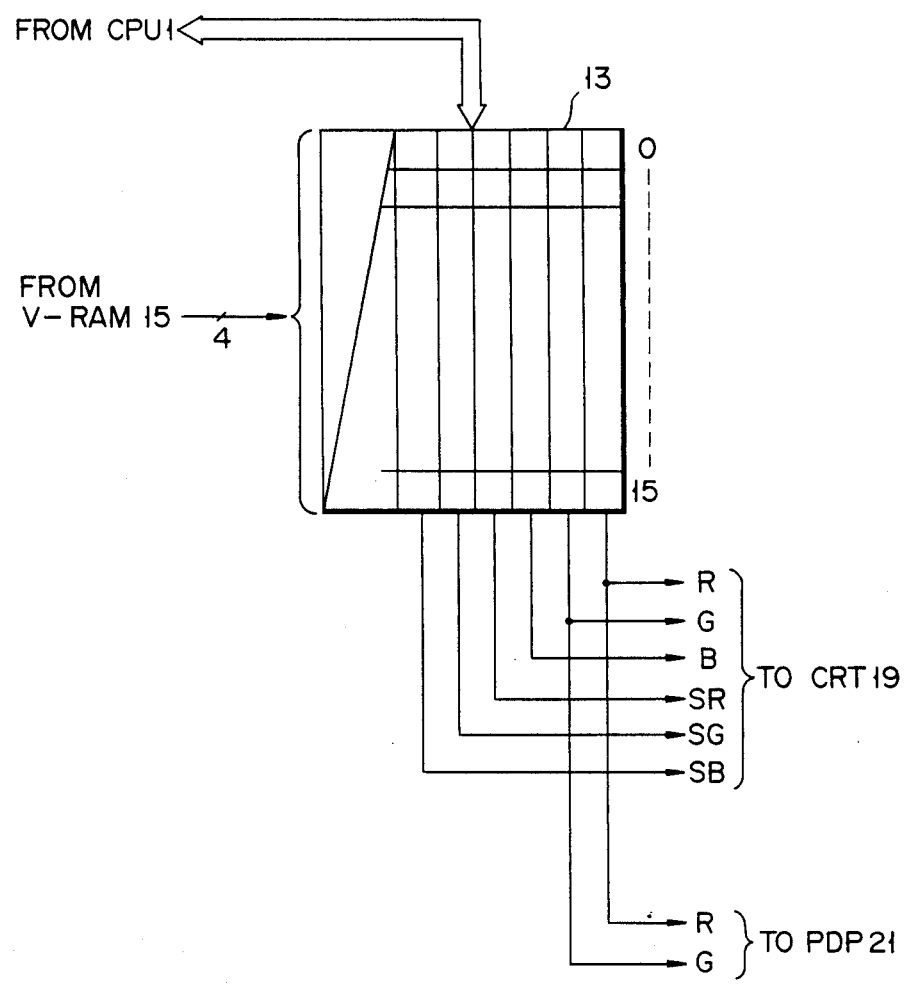
FIG 3 is a view showing an arrangement of the palette shown in FIG. 1.

FIG. 3 shows an arrangement of palette 13 shown in FIG. 1. As is shown in FIG. 3, palette 13 sends 6-bit display data to CRT 19. The 6-bit display data is constituted by red (R), green (G), and blue (B) bits, and supplementary bits SR, SG, and, SB for the R, G, and B bits, respectively. Palette 13 also outputs 2-bits (R and G bits) of the 6-bit display data to PDP interface 23.

Figure 4:
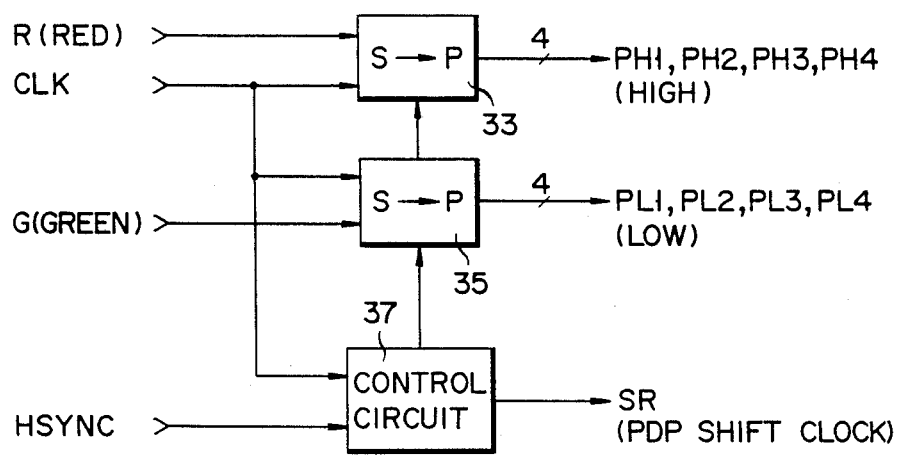
FIG. 4 is a detailed block diagram of the interface for the plasma display apparatus shown in FIG. 1.

FIG. 4 is a detailed block diagram of PDP interface 23. As is shown in FIG. 4, PDP interface 23 comprises serial-parallel converters 33 and 35, and horizontal sync (HSYNC) control circuit 37. PDP display data R and G (two bits) input from palette 13 are respectively converted to 4-bit data (for four continuous pixels) PH1 through PH4 and PL1 through PL4, and the converted data are supplied as 8-bit 4-gradation display data to PDP 21, via a 4-gradation display driver (not shown).

Figure 5:
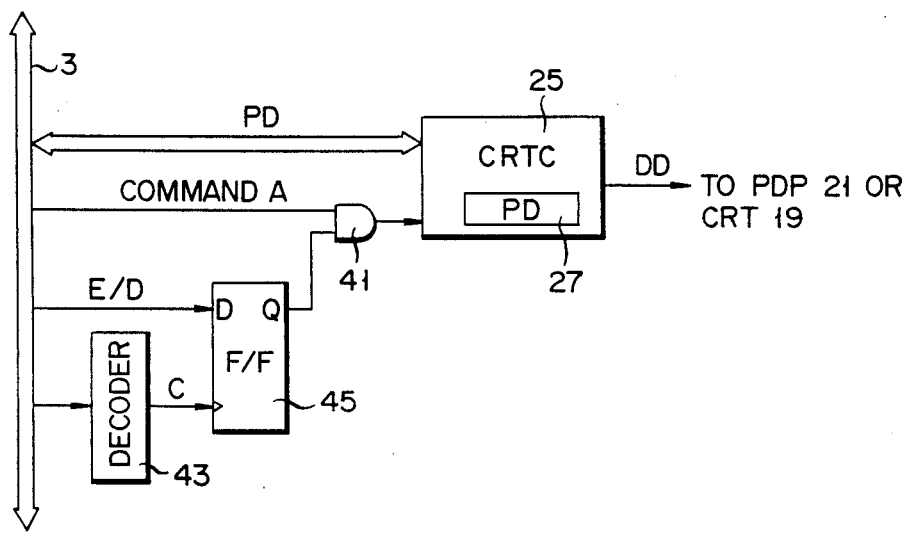
FIG. 5 is a detailed block diagram of a PD setting control circuit shown in FIG. 1.

FIG. 5 is a block diagram showing an arrangement of PD setting control circuit 29 for setting PDs in register 27 in CRTC 25. When PDs are set in register 27, CPU 1 outputs an I/O device address of CRTC 25 onto system bus 3. The I/O device address is decoded by decoder 43, and a clock signal is supplied to the clock input terminal of flip-flop 45. CPU 1 also supplies enable signal E to the D input terminal of flip-flop 45, as a result of which, flip-flop 45 is set. The Q output from flip-flop 45 is supplied to the other input terminal of AND gate 41. Meanwhile, CPU 1 supplies PDs to CRTC 25. In response to a display timing signals, generating parameter setting command output from AND gate 41, the PDs are set in register 27 in CRTC 25.

Figure 6A:
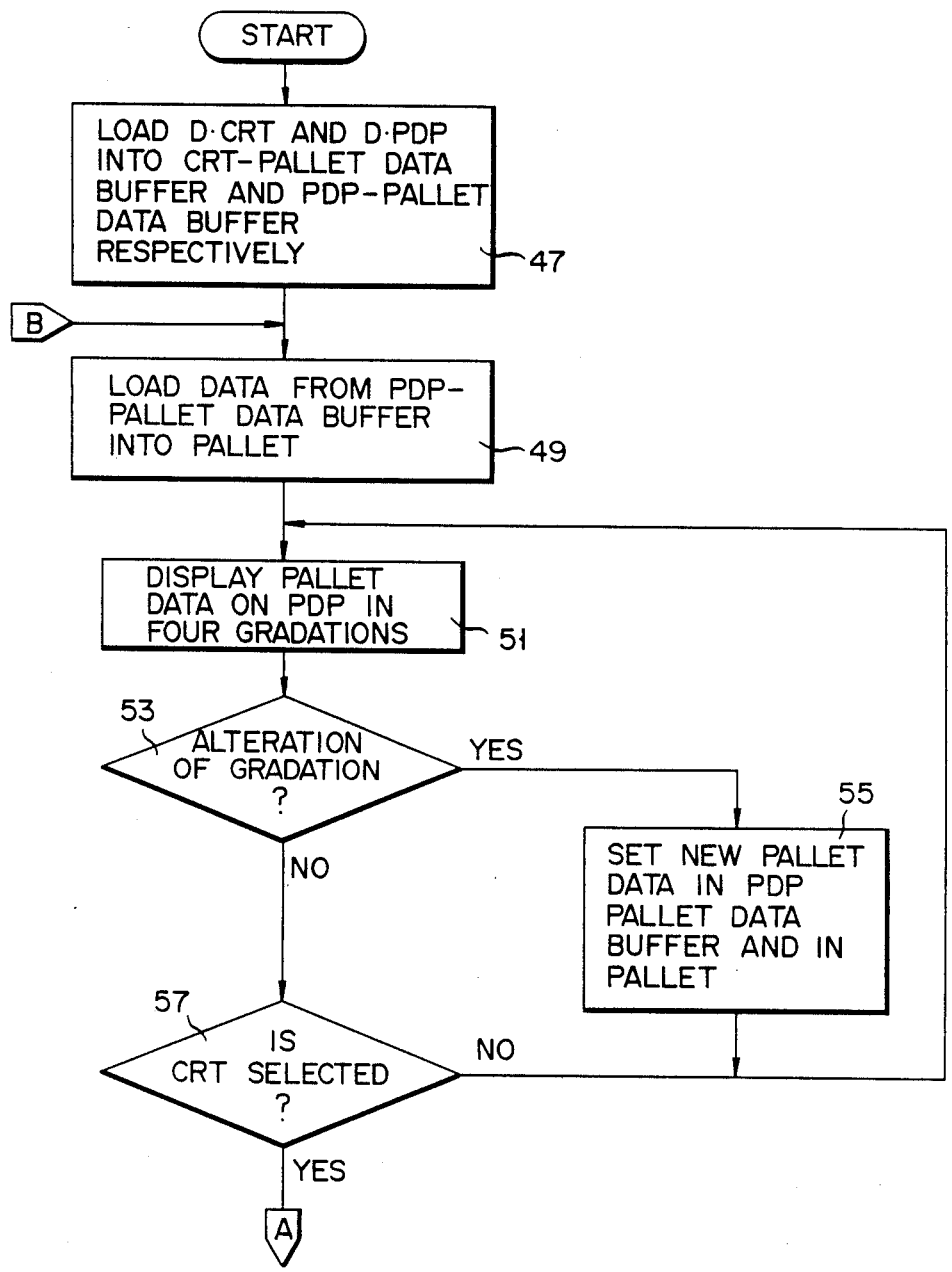
FIGS. 6A and 6B are flow charts showing an operation of the embodiment shown in FIG. 1.
Figure 6B:
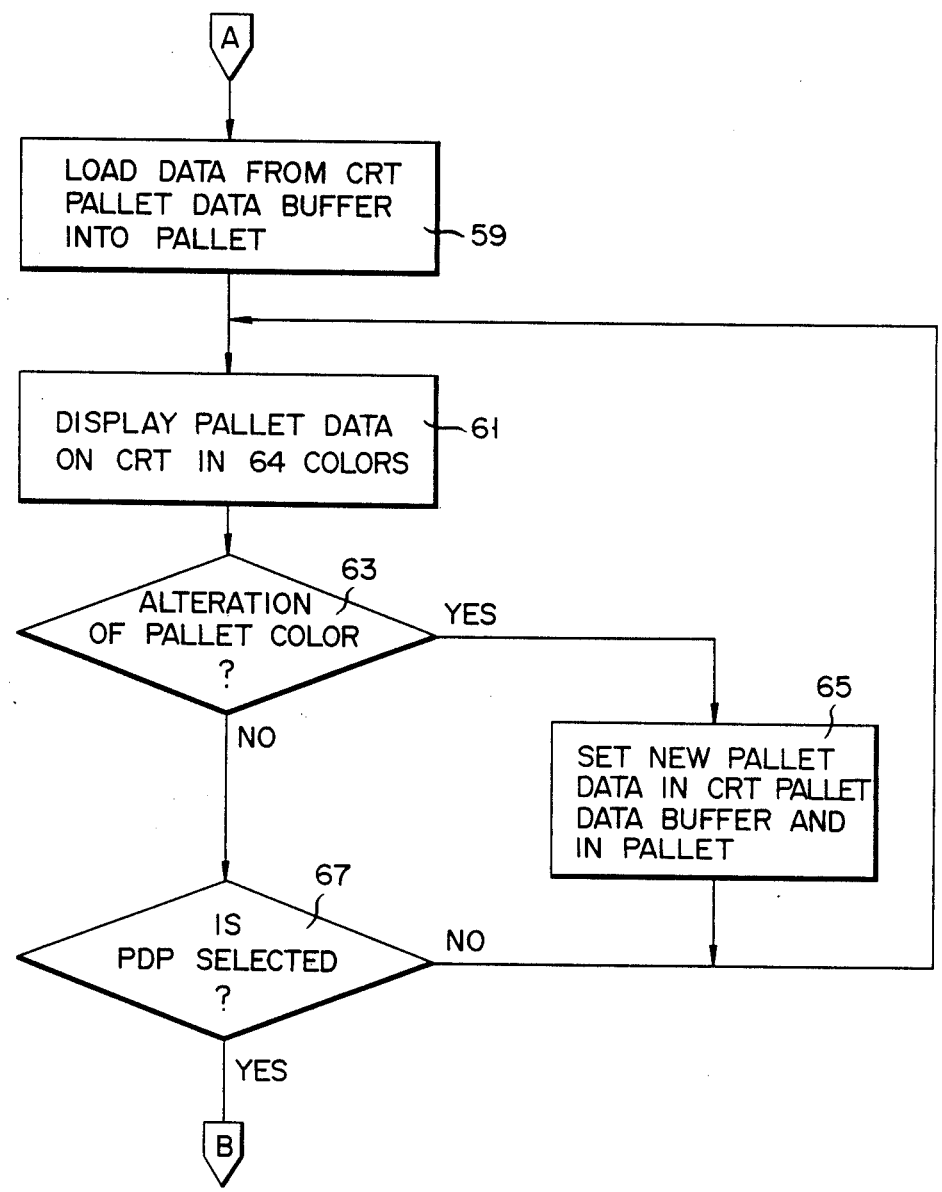

The embodiment of the present invention, having the arrangement as described above, will now be described with reference to the flow charts shown in FIGS. 6A and 6B.

When the embodiment shown in FIG. 1 is powered, CPU 1 reads out, from BIOS.ROM 17, initial values D.CRT and D.PDP to be set in buffers 5 and 7, respectively, and loads the values therein, via system bus 3, in step 47. When no display selection designation command is input through keyboard 16, or when a new selection designation command of PDP 21 is input, CPU 1 reads out palette data stored in buffer 7 and loads the data in palette 13, via system bus 3, in step 49. In step 51, CPU 1 converts color data (16 colors),supplied from V-RAM 15 into four gradations, using palette 13, and displays the converted data on PDP 21. In this case, CPU 1 drives control circuit 29, and sets PDs in register 27. More specifically, when CRTC 25 receives display timing setting command A sent from CPU 1 via AND gate 41 shown in FIG. 5, it receives PDs of a new display mode to be set via system bus 3, and sets them in internal register 27. As a result, CRTC 25 generates display timing signals DD based on the set PDs, reads out display data from V-RAM 15, in synchronism with the display timing signals, and sends the readout data to PDP 21 via PDP interface 23. In this case, flip-flop 45, for ON/OFF-controlling AND gate 41, latches enable/disable data E/D supplied from CPU 1, in synchronism with latch timing signal C. When flip-flop 45 is in a reset state, i.e., when it retains E/D data "0", AND gate 41 inhibits the outputting of display timing-setting command A (A=1), and when flip-flop 45 is in a set state, i.e., when it retains E/D data "1", AND gate 41 cancels this command output-inhibition.

In this manner, upon loading of palette data in palette 13, PDs for a corresponding display (PDP 21 or CRT 19) are set in register 27 in CRTC 25 in accordance with the timing control performed by control circuit 29 under the control of CPU 1. Display data are read out from V-RAM 15 based on the display timing signals generated based on the PDs.

2-bit PDP display data (R and G), which is read out from V-RAM 15 and subjected to gradation conversion from 16 colors to four gradations by palette 13 is supplied to PDP interface 23. In PDP interface 23, two bits, i.e., an R bit and a G bit, are respectively converted to 4-bit data PH1 through PH4 and PL1 through PL4 by serial/parallel converters 33 and 35. As a result, 8-bit display data, i.e., display data in units of four pixels and four gradations, is supplied to PDP 21 through the 4-gradation display driver (not shown). In this embodiment, when the 2-bit PDP display data (R, G) supplied from palette 21 is "0,0", the duty ratio of a discharging pulse width for one horizontal period for driving a Y electrode of PDP 21 is set to 10%, while when the data is "0,1", "1,0", and "1,1", the duty ratio is set to 40%, 70%, and 100%, respectively.

If, in step 53 (FIG. 6A), a command for altering the correspondence between colors and gradations and palette data are input upon designation by a user, CPU 1 rewrites the content of palette 13 to be designated palette data. As a result, 16 colors are converted to four gradations based on the rewritten PDP palette data.

On the other hand, if, in step 57, a command is input, through keyboard 16, to switch the display apparatus to be used from PDP 21 to CRT 19, CPU 1 reads out the content of buffer 5, and sets the readout data in palette 13, via system bus 3, in step 59. CPU 1 then reads out display data from V-RAM 15 and performs color conversion from 16 colors to 64 colors, using palette 13. As a result, in step 61, CPU 1 causes CRT 19 to display color-converted display data based on display timing signals from CRTC 25. In this case, upon switching of the display apparatus to be used for display, CPU 1 sets the PDs in register 27 in CRTC 25 under the timing control of control circuit 29. Display data are read out from V-RAM 15 at timings based on display timing signals DD generated based on the PDs.

If an alteration designation command from the palette indicating that the correspondence between 16 colors and 64 colors is altered and selection designation data are input upon designation by the user in, step 63, CPU 1 executes rewrite processing of palette 13 in accordance with an application program. As a result, CPU 1 performs color conversion, from 16 colors to 64 colors in accordance with the palette colors of CRT palette data in step 65.

If, in step 67, a command is input by the user, to switch the display apparatus to be used from CRT 19 to PDP 21 upon designation, the flow returns to step 49 and CPU 1 reads out the content of buffer 7 and sets the readout data in palette 13 via system bus 3. CPU 1 then reads out display data from V-RAM 15, and performs conversion from 16 colors to four gradations, in accordance with palette 13 whose content is rewritten with PDP palette data, thereby displaying data on PDP 21. In this case, CPU 1 sets PDs for PDP 21 in register 27 in CRTC 25, on the basis of the timing signal from control circuit 29. CRTC 25 generates display timing signals DD for PDP 21 in accordance with the PDs set in register 27. Therefore, CPU 1 reads out the display data from V-RAM 15 based on display timing signals DD.

In this manner, data color-displayed on CRT 19 is converted from an arbitrary color to the corresponding gradation, using palette 13 and CRTC 25 common to CRT 19 and PDP 21, and the converted data is displayed on PDP 21.

In this embodiment, color-to-gradation conversion from 16 colors to four gradations is performed. However, conversion from, for example, 16 colors to eight gradations, and conversion from 64 colors to 16 gradations, is also possible. That is, display data programmed to be displayed on CRT 19 can be displayed on PDP 21 in various numbers of colors and gradations.

Figure 7:
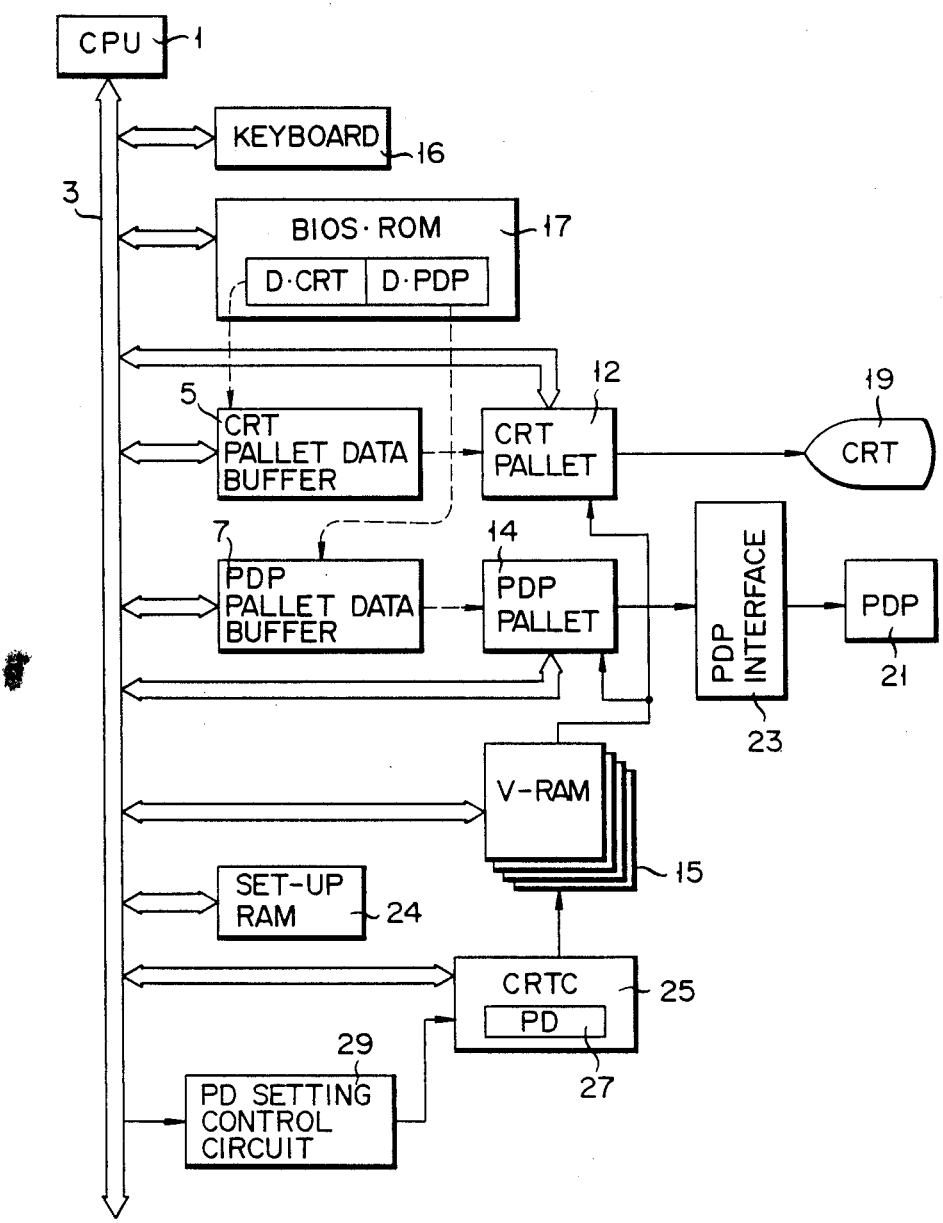
FIG. 7 is a block diagram showing another embodiment of the present invention.

FIG. 7 is a block diagram showing another embodiment of the present invention.

In the embodiment shown in FIG. 1, CRT 19 and PDP 21 are display-controlled by use of common palette 13. In the embodiment shown in FIG. 7, on the other hand, palette 12 for CRT 19 and palette 14 for PDP 21 are arranged. In this manner, the same effect as in the embodiment shown in FIG. 1 can be obtained when the palettes are respectively arranged for CRT 19 and PDP 21. The same reference numerals in FIG. 7 denote the same parts as in FIG. 1, and since the operation of this embodiment is the same as that of FIG. 1, a description thereof is thus unnecessary.

Figure 8:
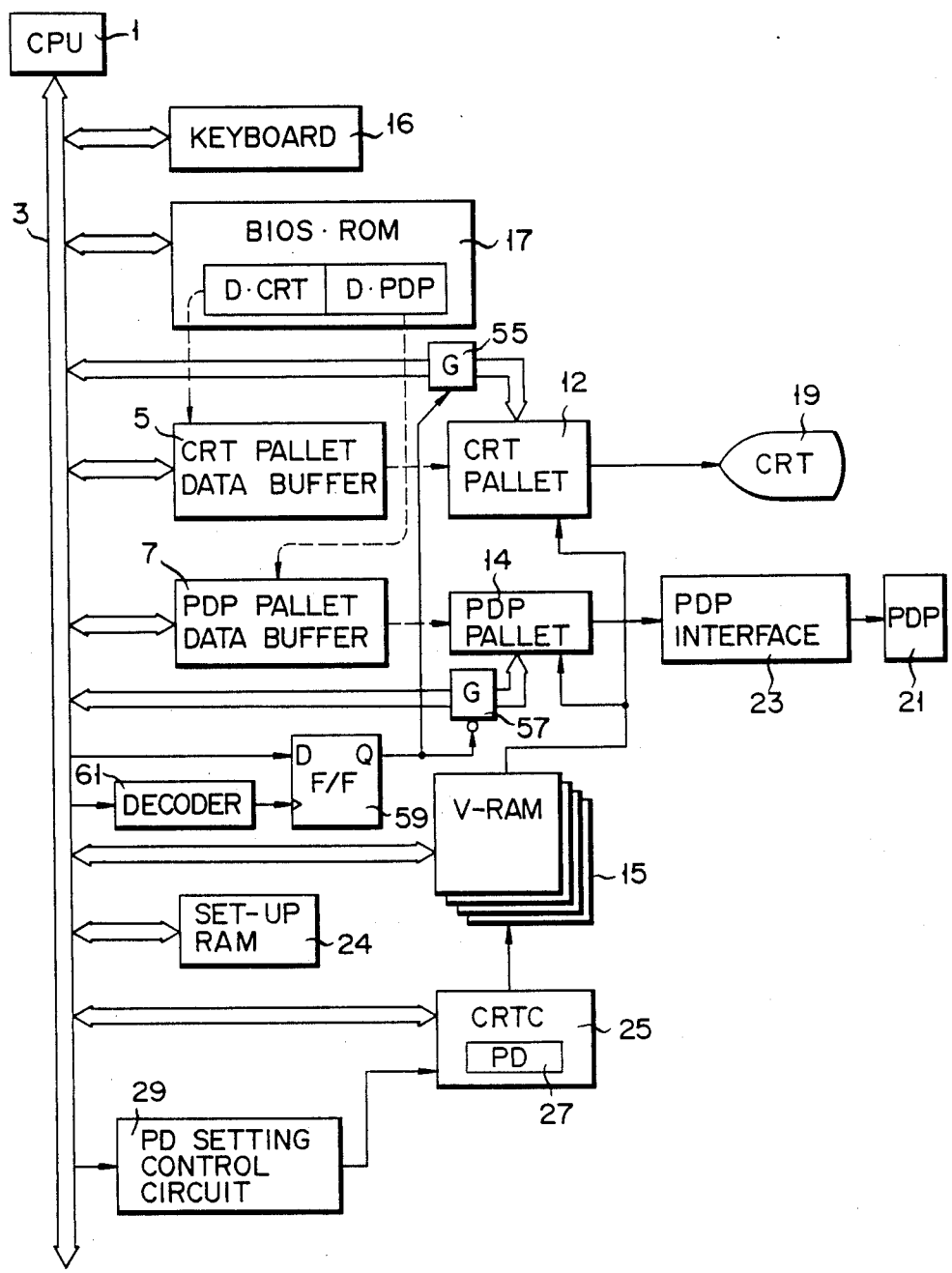
FIG. 8 is a block diagram showing still another embodiment of the present invention.

FIG. 8 shows still another embodiment of the present invention.

Again, the same reference numerals in FIG. 8 denote the same parts as in FIGS. 1 and 7, and thus a description thereof will be omitted.

In this embodiment, a hardware arrangement is adopted whereby palette data can be selectively written in CRT and PDP palettes 12 and 14, by use of a common address (in this embodiment, the I/O port address). More specifically, write control, gates 55 and 57 are respectively connected to palettes 12 and 14, and are alternately enabled to selectively perform write access of palette data (multicolor display palette data/gradation display palette data) a corresponding palette. These gates 55 and 57 are controlled by flip-flop 59. A set or reset signal is supplied to the input terminal of flip-flop 59. When a palette write processing routine stored in BIOS.ROM 17 is executed, a setting command of the set or reset signal to flip-flop 59 is decoded by decoder 61 and is input to the clock input terminal of flip-flop 59.

When data is written in CRT and PDP palettes 12 and 14 of the system having the above arrangement, CPU 1 executes the palette write processing routine stored in BIOS.ROM 17. More specifically, CPU 1 outputs set data and a set command onto system bus 3. The set command is decoded by decoder 61, and is supplied to the clock input terminal of flip-flop 59. Flip-flop 59 is set in synchronism with the input clock. Write control gate 55 for palette 12 is then enabled, and write control gate 57 for palette 14 is disabled. CPU 1 then writes default value D.CRT of multicolor display in palette data in palette 12, using an I/O port address common to palettes 12 and 14, and after the default value has been written, CPU 1 resets flip-flop 59. Then, write control gate 55 for palette 12 is disabled, and write control gate 57 for palette 14 is enabled. CPU 1 writes default value D.PDP for gradation display palette data in PDP palette 14.

FIG. 9 shows yet another embodiment of the present invention.

Figure 11B:
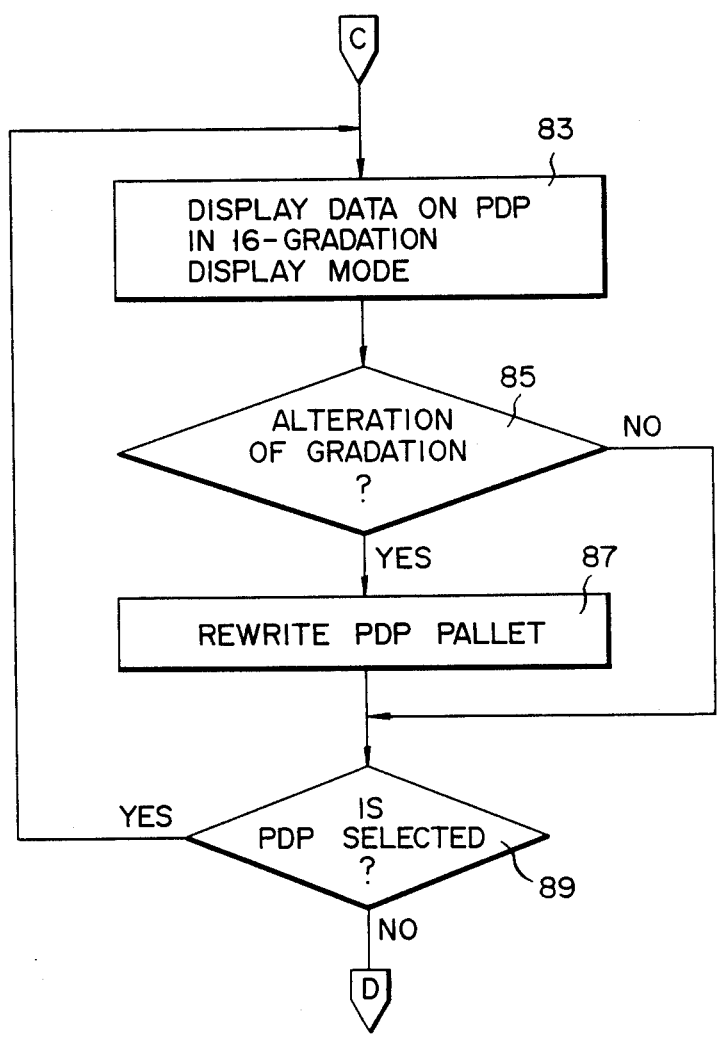

In this embodiment, CRT and PDP palettes 12 and 14 are connected in series with each other. The operation of this embodiment of the present invention will be described with reference to the flow charts shown in FIGS. 11A and 11B.

In, step 70, CPU 1 loads default value D.CRT of CRT palette data and default value D.PDP of PDP palette data stored in BIOS.ROM 17 into CRT palette data buffer 5 and PDP palette data buffer 7, respectively.

In step 71, CPU 1 loads default value D.CRT of CRT palette data, stored in CRT palette data buffer 5 into CRT palette 12. In step 73, CPU 1 loads default value D.PDP of PDP palette data stored in PDP palette data buffer 7 into PDP palette 14. CPU 1 then checks in step 75 if CRT 19 is selected. If NO in step 75, CPU 1 converts display data of 16 colors read out from V-RAM 15 into data of four gradations in accordance with gradation display palette stored in PDP palette 14, and causes PDP 21 to gradation-display the converted data in step 83. CPU 1 then performs color-to-gradation conversion from 64 colors to 16 gradations in accordance with gradation display palette data stored in PDP palette 14 connected to palette 12, and causes PDP 21 to display data through PDP interface 23.

Figure 10:
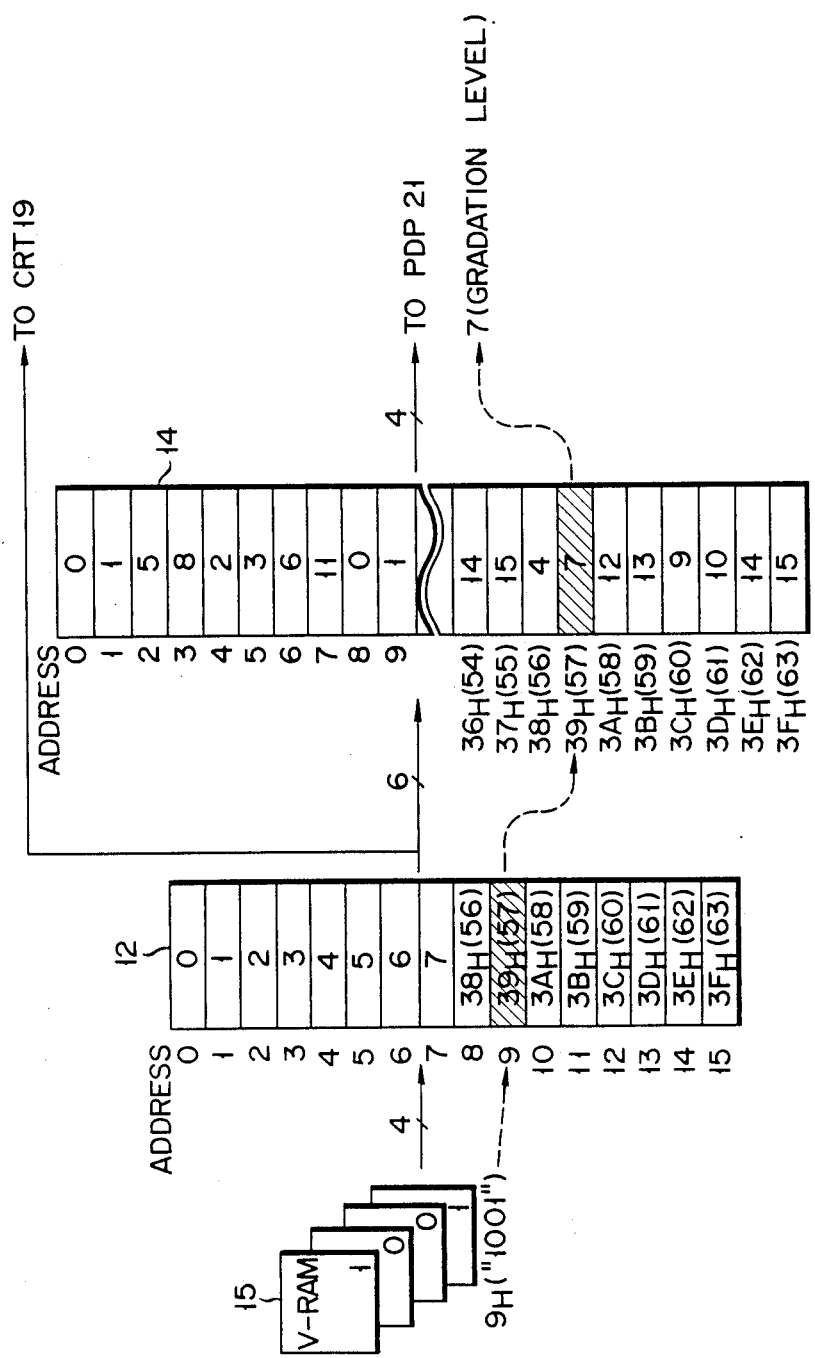
FIG. 10 is a view,-for explaining the arrangement of each of the palettes included in the embodiment shown in FIG. 9, and a color-to-gradation conversion operation using the palette.

FIG. 10 shows converted display data by palettes 12 and 14 in this case. When CPU 1 reads out 4-bit display data 9H ("1001") indicating blue in 16-color- display, it reads out 6-bit multicolor display data 39H ("111001") indicating blue in 64-color display from CRT palette 12 in accordance with the readout data, and supplies the readout data to CRT 19. The multicolor display data is also supplied to PDP palette connected to the output of palette 12, and thus, conversion from 64 colors to 16 gradations is performed. As a result, PDP palette 14 outputs 4-bit gradation display data 7H ("0111") indicating a seventh gradation (intermediate gradation). In this manner, display data which is color-to-gradation converted in the order of 16 colors→64 colors→16 gradations through palettes 12 and 14 is supplied to PDP 21, and is multi-gradation displayed.

In this manner, PDP 21 receives display data which is color-converted by palette 12 and is then color-to-gradation converted by palette 14. The correspondence between colors and gradations of PDP, 21 is determined based on both multicolor display palette data set in palette 12 and gradation display palette data set in palette 14. Therefore, the gradations of PDP 21 directly reflect display colors of /CRT 19. When multicolor display palette data of palette 12 is rewritten, the correspondence between colors and gradations on PDP 21 is switched upon switching of display colors on CRT 19. Thus, switching of display colors on CRT 19 can be confirmed on PDP 21.

Returning to step 85 in FIG. 11B, when a command indicating alteration of the correspondence between colors and gradations and palette data are input, CPU 1 rewrites the content of PDP palette 14 with the input palette data. Thereafter, CPU 1 performs color-to-gradation conversion from 64 colors to 16 gradations in accordance with the rewritten PDP palette data.

If it is determined in step 89 or 75 that CRT 19 is selected, CPU 1 reads out display data from V-RAM 15 in step 77, and performs conversion from 16 colors to 64 colors using CRT palette 12 and displays the converted data on CRT 19. If a command indicating alteration of palette colors and palette selection designation data are input in step 79, CPU 1 rewrites the content of CRT palette 12 with the input palette data. Thereafter, CPU 1 performs color conversion from 16 colors, to 64 colors in accordance with the rewritten CRT palette data.

In the above embodiment, when a designation is made to perform display using only PDP 21, CPU 1 executes only gradation display of PDP 21 using PDP palette 14. On the other hand, when a designation is made to perform display using only CRT 19, CPU 1 performs display on only CRT 19 using CRT palette 12.

In this manner, one or both of CRT 19 and PDP 21 are selectively display-driven. CRT 19 displays data which is converted from 16 colors to 64 colors in accordance with multicolor display palette data stored in palette 12. PDP 21 displays multi-gradation data which is obtained such that data converted from 16 colors to 64 colors by palette 12 is then converted from 64 colors to 16 gradations by palette 14 connected to the output of palette 12. Therefore, the correspondence between colors and gradations of multi-gradation data displayed on PDP, 21 follows multicolor display palette data set in palette 12. When the content of CRT palette data is altered, the correspondence between colors and gradations is altered. That is, when the correspondence in display colors of CRT 19 is altered, the correspondence between colors and gradations of PDP 21 is also altered. Therefore, alteration of display colors on CRT 19 can be confirmed on PDP 21.

FIG. 12 and FIGS. 13A through 13C show still another embodiment of the present invention. In this embodiment, gradation-display luminance characteristics of PDP 21 are corrected in correspondence with display luminance characteristics of CRT 19. As a result, gradations in correspondence with colors can be clearly confirmed on PDP 21.

Figure 13A:
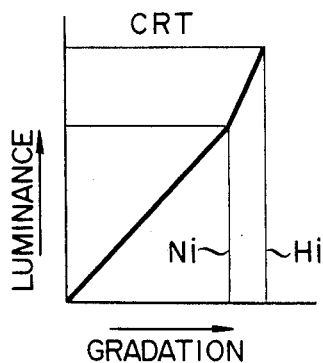
FIGS. 13A through 13C are views respectively showing CRT and PDP display luminance characteristics in the case of the embodiment shown in FIG. 12, and corrected palette data set in a PDP palette in accordance with these characteristics.

When the gradation input level of PDP 21 is corresponded to CRT 19, CRT 19 has gradation-display luminance characteristics shown in FIG. 13A. Therefore, a difference between a display luminance at a normal gradation level (Ni) and that at a high-gradation level (Hi) is relatively large, and hence, the difference between the gradation levels can be clearly confirmed on CRT 19.

Figure 13B:
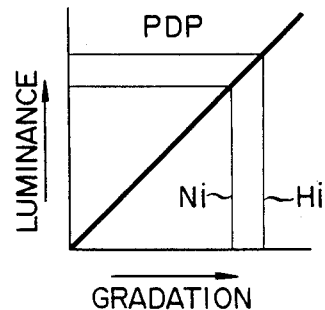

On the other hand, PDP 21 has gradation-display luminance characteristics shown in FIG. 13B. In this case, a difference between display luminances at normal gradation level (Ni) and high-gradation level (Hi) is relatively small, and the difference between the gradation levels cannot be clearly confirmed.

Figure 13C:
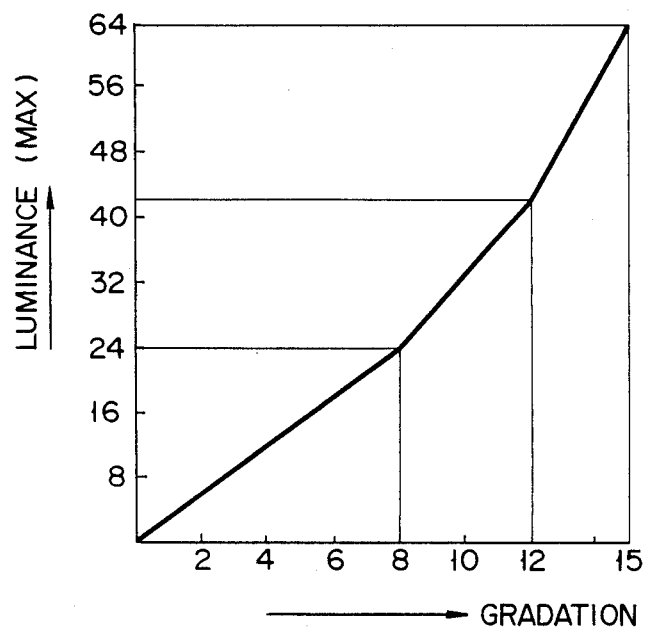

In this embodiment, gradation-display luminance characteristics of PDP 21 are corrected on PDP palette 14 in correspondence with CRT display luminance characteristics. In this embodiment, gradation level data corresponding to 16 gradations set in palette 14 are further segmented in units of ¼. A display luminance at a high-gradation level is corrected in units of segmented gradations, as shown in FIG. 13C.

Figure 12:
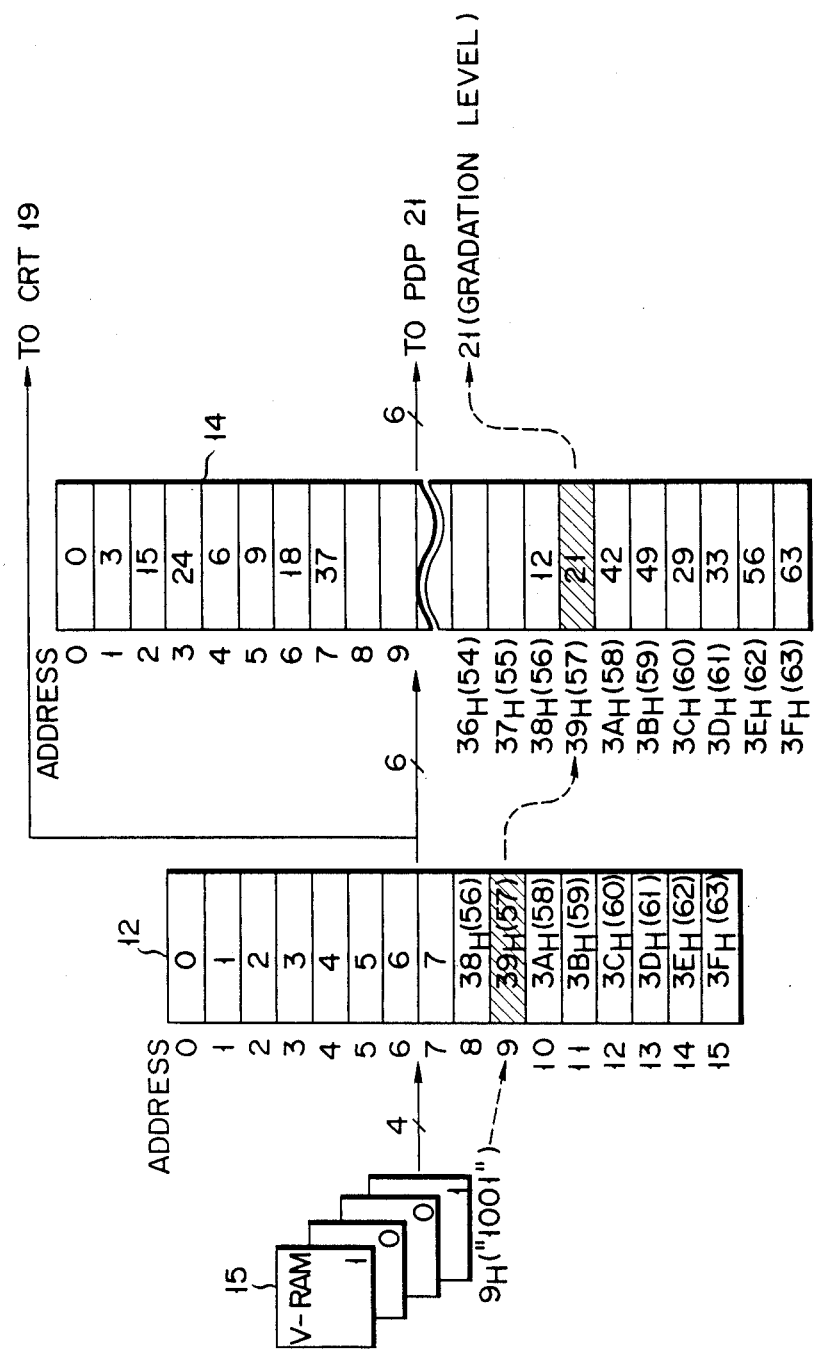
FIG. 12 is a view for explaining the arrangement of each of the palettes included in a further embodiment of the invention, and a color-to-gradation conversion operation using the palette.

FIG. 12 shows typical set values of gradation display palette data on PDP palette 14 in this case. In this embodiment, corrected gradation display data corresponding to 16 gradations selected from 64 gradations is represented by 6 bits, and the 6-bit gradation display data is sent to PDP 21.

In this manner, since gradation-display luminance characteristics of PDP 21 are corrected on PDP palette 14 in correspondence with the display luminance characteristics of CRT 19, gradations corresponding to colors can be clearly confirmed on PDP 21.

In this embodiment, CRT 19 and PDP 21 have separate display controllers. However, even when CRT 19 and PDP 21 are display-driven by a common display controller, multi-gradation data taking color-gradation correspondence can be displayed on PDP 21 by selectively driving CRT 19 or PDP 21.

In this embodiment, color-to-gradation conversion from 64 colors to 16 gradations has been exemplified. However, in another color-to-gradation conversion, data having color display elements for a color CRT display can be gradation-displayed on PDP 21 in correspondence with colors.

Figure 14:
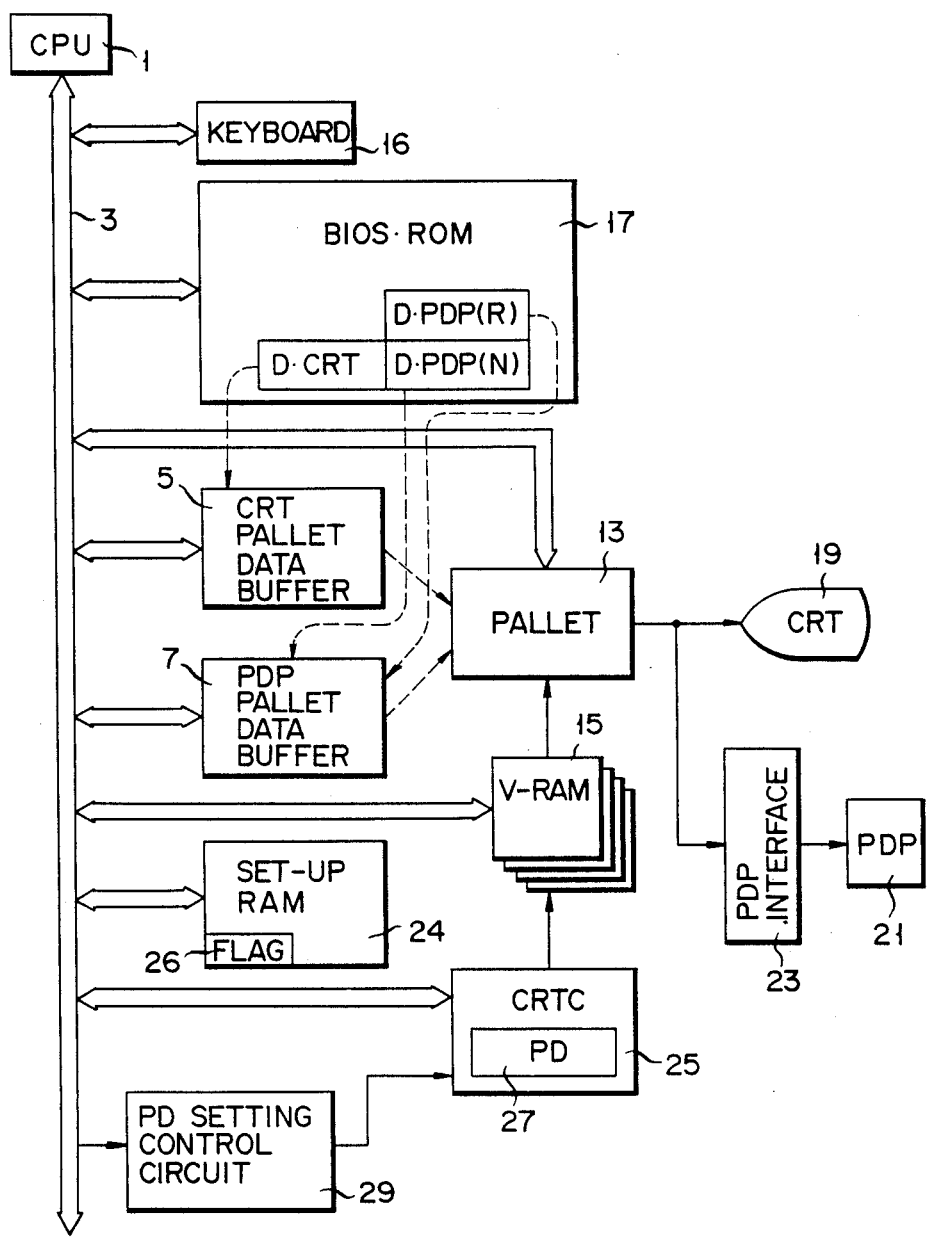
FIG. 14 is a block diagram showing yet another embodiment of the present invention.

FIG. 14 is a block diagram showing still another embodiment of the present invention.

In this embodiment, BIOS.ROM 17 stores, as palette default value D.PDP corresponding to display on PDP 21, normal display default value D.PDP(N) corresponding to display on CRT 19, and inverted display default value D.PDP(R) in which a high-luminance display level (gradation level 3) and a normal luminance level (gradation level 2) are replaced.

Upon starting of a system by turning on a power switch, CPU 1 loads PDP and CRT palette default values D.CRT and D.PDP stored in BIOS.ROM 17 into buffers 5 and 7, respectively.

Figure 15:
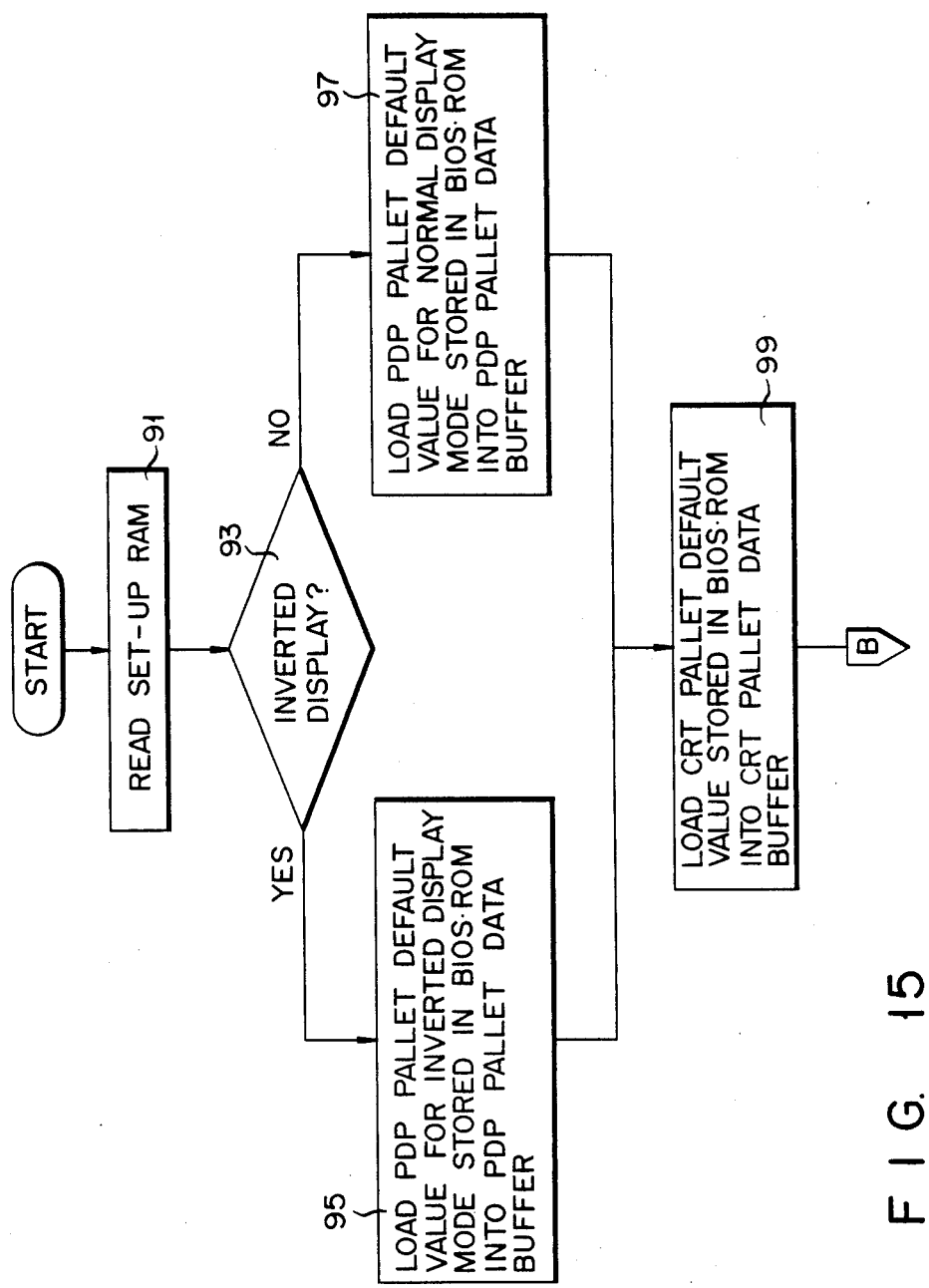
FIG. 15 is a flow chart showing processing performed in a set-up RAM of the embodiment shown in FIG. 14.

This processing will be described below in detail with reference to FIG. 15.

In step 91, CPU 1 refers to inverted display flag 26 allocated in set-up RAM 24. CPU 1 then checks in step 93 if flag 26 indicates an inverted display mode. If YES in step 93, CPU 1 reads out inverted display default value D.PDP(R) stored in BIOS.ROM 17, and loads the readout value into buffer 7 in the main memory, in step 95. However, if NO in step 93, CPU 1 reads out normal display default value D.PDP(N) in BIOS.ROM 17 and loads the readout value into buffer 7 through system bus 3 in step 97. In step 99, CPU 1 reads out CRT palette default value D.CRT from BIOS.ROM 17, and loads the readout value into buffer 5. In this manner, PDP and CRT palette data stored in BIOS.ROM 17 are set in buffers 7 and 5, respectively.

As a result, when, the PDP normal display default value is set in palette 13, display data is displayed in gradation, the luminance of which directly reflects the bit content, (R, G) of the PDP display data output from palette 13. On the other hand, when the PDP inverted display default value is set in palette 13, the luminance does not reflect the bit content (R, G) of PDP display data output from palette 13. That is, display data outputs at high and normal luminance levels are replaced with each other. Therefore, when display data (e.g., 7H: "0111") at a normal luminance level is output from V-RAM 15, PDP display data (R="0", G="1") of gradation level 3 representing the highest luminance is output from palette 13.

Thus, data which is displayed on CRT 19 at a normal luminance is displayed on PDP 21, the luminance of which is lower than that of CRT 19, at a highest display luminance. For example, text characters can be clearly displayed on PDP 21.

In this manner, one of gradation display based on normal display default value D.PDP(N) combining CRT display and luminance level, and gradation display based on inverted display default value D.PDP(R) in which high-luminance level (gradation level 3) and normal luminance level (gradation level 2) are replaced can be arbitrarily selected as PDP palette data in accordance with a display content, such as graphic display, text display, and the like. Thus, data which is displayed at a normal luminance on CRT 19 can be displayed at a highest display luminance on PDP 21, whose luminance is lower than that of CRT 19. As a result, text characters and the like can be clearly displayed on PDP 21.

In this embodiment the case has been exemplified wherein CRT 19 and PDP 21 are driven by selectively using a common palette. However, the present invention is not limited to this embodiment. For example when a color display palette and a plasma display palette are independently arranged, display control using color-gradation correspondence can be performed as in the above embodiment. In this case, the arrangement and operation can be easily understood from the above embodiment, and a detailed description thereof will be omitted herein.

In the above embodiment, PDP 21 is 4-gradation display driven, and high and normal luminance levels are selectively replaced with each other. However, even if the number of PDP display gradations, and luminance levels to be replaced are different from those in the above embodiment, the present invention can be easily made.

What is claimed is:

1. A display control system for a CRT/flat panel display apparatus, which selectively drives a cathode ray tube (CRT) display apparatus and a flat panel display apparatus, the display control system comprising:
    single palette means for selectively receiving display color conversion palette data for said CRT display apparatus and gradation display palette data for said flat panel display apparatus and for converting applied data to display data according to the received palette data;
    display apparatus selection means for selecting one of said CRT and flat panel display apparatuses as a selected display apparatus;
    display controller means for causing the selected display apparatus to provide an output of display data according to the palette data received by said single palette means; and
    palette data setting means for setting the palette data corresponding to the selected display apparatus in said single palette means.

2. A display control system according to claim 1, further comprising palette data alteration instruction means for outputting a signal for instructing alteration of the palette data, said palette data setting means altering the palette data to be set in said single palette means in response to the signal from said palette data alteration instruction means.

3. A display control system according to claim 1, wherein said single palette means receives data having color-display elements suitable for display on said CRT display apparatus, alters the data into a plurality of gradation data, and outputs the gradation data to said flat panel display apparatus.

4. A display control system for a color CRT/flat panel display apparatus, which selectively drives a color cathode ray tube (CRT) display apparatus to provide a multicolor display of applied data in accordance with multicolor display palette data, and a flat panel display apparatus to provide a gradation display of applied data in accordance with gradation display palette data, the display control system comprising:
    first palette data memory means, corresponding to the CRT display apparatus, for storing multicolor display palette data;
    second palette data memory means, corresponding to the flat panel display apparatus, for storing gradation display palette data;
    single palette means for selectively receiving palette data of said first and second palette data memory means;
    display apparatus selection means for selecting one of said color CRT display apparatus and said flat panel display apparatus as a elected display apparatus;
    display controller means for causing the selected display apparatus to display applied data according to the palette data set in said single palette means; and means for reading out the palette data from the palette data memory means corresponding to the selected display apparatus and setting the readout palette data in said single palette means.

5. A display control system according to claim 4, wherein the flat panel display apparatus is operable to display data at a plurality of gradation formats, and wherein said display control system further comprises gradation alteration instruction means for outputting a signal for selecting a gradation format, wherein said second palette data memory means stores a plurality of gradation display palette data each corresponding to one of the gradation formats, and said palette data setting means reads, in response to the signal from said gradation alteration instruction means, the palette data from said second palette data memory means which corresponds to the selected gradation format and sets the readout palette data in said single palette means.

6. A display control system according to claim 4:
wherein the flat panel display apparatus is operable to display data at a plurality of gradation formats each setting the luminance of display pixel data at a specified level;
wherein said display control system further comprises a gradation alteration instruction means for outputting a signal for selecting a gradation format,
wherein said second palette data memory means stores a first gradation display palette data establishing a gradation format in which, when display pixel data displayed on said color CRT display apparatus have high and low luminance levels, the luminance levels of display pixel data displayed on said flat panel display apparatus are set at high and low luminance levels, respectively, and said second palette data memory means stores a second gradation display palette data establishing an inverted gradation format in which, when display pixel data displayed on said color CRT display unit have high and low luminance levels, the luminance levels of the display pixel data displayed on said flat panel display apparatus are set at low and high luminance levels, respectively; and
wherein said palette data setting means reads, in response to the signal from said gradation alteration instruction means, the palette data from said second palette data memory means which correspond to the selected gradation format and sets the readout palette data in said single palette means.

7. A display control system in a system which comprises a flat panel display apparatus as a standard display apparatus, and to which a color CRT display apparatus can be arbitrarily connected, each of said display apparatuses being respectively operable to display applied data according to flat panel palette data and CRT palette data, said display control system comprising:
first palette means, for receiving CRT palette data and for performing color conversion;
second palette means for receiving flat panel palette data and for performing color-to-gradation conversion; and
display controller means for, in response to the connection of said color CRT display apparatus, causing said color CRT display apparatus to display applied data according to the palette data set in said first palette means, and for causing, when said color CRT display apparatus is not connected to said system, said flat panel display apparatus to display applied data according to the flat panel palette data set in said second palette means.

8. A display control system according to claim 7, wherein separate I/O device addresses are respectively assigned to said first and second palette means.

9. A display control system according to claim 7, wherein said first and second palette means have a common address assigned thereto and said first and second palette means are responsive to a signal selectively supplied thereto to selectively enable write access of the palette data into said first and second palette means.

10. A display control system according to claim 7, further comprising:
means for generating an alteration request to alter the palette data; and
means for altering the palette data set in said first and second palette means in response to said alteration request.

11. A display control system according to claim 7, further comprising:
first palette data memory means for storing palette data to be set in said first palette means;
second palette data memory means for storing palette data to be set in said second palette means; and
means for, in response to the connection of said color CRT display apparatus, setting the palette data stored in said first palette data memory means into said first palette means, and for, when said color CRT display apparatus is not connected to said system, setting the palette data stored in said second palette data memory means into said second palette means.

12. A display control system according to claim 11:
wherein the flat panel display apparatus is operable to display data at a plurality of gradation formats each setting the luminance of display pixel data at a specified level, and wherein said display control system further comprises gradation alteration instruction means for outputting a signal for selecting a gradation format;
wherein said second palette data memory means stores a first gradation display palette data establishing a gradation format in which, when display pixel data displayed on said color CRT display apparatus have high and low luminance levels, the luminance levels of display pixel data displayed on said flat panel display apparatus are set at high and low luminance levels, respectively, and said second palette data memory means stores a second gradation display palette data establishing an inverted gradation format in which, when display pixel data displayed on said color CRT display unit have high and low luminance levels, the luminance levels of the display pixel data displayed on said flat panel display apparatus are set at low and high luminance levels, respectively; and
wherein said palette data setting means reads, in response to the signal from said gradation alteration instruction means, the palette data from said second palette data memory means which corresponds to the selected gradation format and sets the readout palette data in said second palette means.

13. A display control system according to claim 7, wherein said second palette means receives a flat panel display palette data for correcting display luminance-gradation characteristics for said flat panel display apparatus to be substantially equivalent to those for said CRT display apparatus.

14. A display control system in a system which comprises a flat panel display apparatus as a standard unit, and to which a color CRT display apparatus can be arbitrarily connected, comprising:

luminance level conversion means having a first mode for, when display pixel data displayed on said color CRT display apparatus have high and low luminance levels, setting the luminance levels of display pixel data displayed on said flat panel display apparatus at high and low luminance levels, respectively, and a second mode for, when display pixel data displayed on said color CRT display unit have high and low luminance levels, inverting the luminance levels of the display pixel data displayed on said flat panel display apparatus to low and high luminance levels, respectively; and display controller means for causing said CRT display apparatus to perform multicolor display and causing said flat panel display apparatus to perform multi-gradation display in accordance with the luminance levels converted by said luminance level conversion means.

15. A display control system according to claim 14, wherein said luminance level conversion means comprises single palette means for storing one of display color conversion palette data for said CRT display unit and gradation display palette data for said flat panel display unit.

16. A display control system according to claim 14, wherein said luminance level conversion means comprises:

first palette means, in which palette data specific to said color CRT display apparatus is set, for performing color conversion; and second palette means, in which palette data specific to said flat panel display apparatus is set, for performing color-to-gradation conversion.

17. A display control system according to claim 14, wherein said luminance level conversion means alters the luminance level of display pixel data displayed on said flat panel display apparatus to be a designated luminance level in response to a user's request.

* * * * *

UNITED STATES PATENT AND TRADEMARK OFFICE
CERTIFICATE OF CORRECTION

PATENT NO.   :   4,980,678
DATED        :   December 25, 1990
INVENTOR(S)  :   Hiroki Zenda It is certified that error appears in the above-identified patent and that said Letters Patent is hereby corrected as shown below:

Title Page:
In the Abstract, Line 7, change "red" to --read--.

Claim 4, Column 10, Line 63, change "elected" to --selected--;

Claim 6, Column 11, Line 25, delete the word "a".

Signed and Sealed this

Eleventh Day of August, 1992

Attest:

DOUGLAS B. COMER

Attesting Officer     Acting Commissioner of Patents and Trademarks